United States Patent [19]

Silva

[11] 4,222,877

[45] Sep. 16, 1980

[54] UTILIZATION OF NON-WOVEN FABRICS IN WATER TREATMENT

[76] Inventor: Leziro M. Silva, Av. Coronel S. Fagundes, N) 1.429, Apt. 5, Sao Paulo, Brazil

[21] Appl. No.: 915,195

[22] Filed: Jun. 14, 1978

[30] Foreign Application Priority Data

Jun. 15, 1977 [BR] Brazil .................................. 7703877

[51] Int. Cl.² ...................... B01D 23/10; B01D 39/02
[52] U.S. Cl. .................................. 210/411; 210/484; 210/500 R
[58] Field of Search ................. 210/82, 275, 293, 411, 210/503, 505, 484, 500 R

[56] References Cited

U.S. PATENT DOCUMENTS

| 945,146 | 1/1910 | Wilson | 210/82 |
|---|---|---|---|
| 3,003,643 | 10/1961 | Thomas | 210/503 X |
| 3,367,505 | 2/1968 | Bray | 210/505 X |
| 4,025,438 | 5/1977 | Gelman et al. | 210/503 X |
| 4,065,391 | 12/1977 | Farabaugh | 210/293 X |

*Primary Examiner*—William A. Cuchlinski, Jr.
*Attorney, Agent, or Firm*—Robert E. Burns; Emmanuel J. Lobato; Bruce L. Adams

[57] ABSTRACT

A filtering method, and a filter, for removing turbidity and color from water, uses as a filtering medium, a blanket of non-woven fabric, particularly a blanket of felted fibers. The blanket is, in use, supported on a gravel bed, slotted ceramic blocks or the like, and can be held and protected by a grating.

10 Claims, 22 Drawing Figures

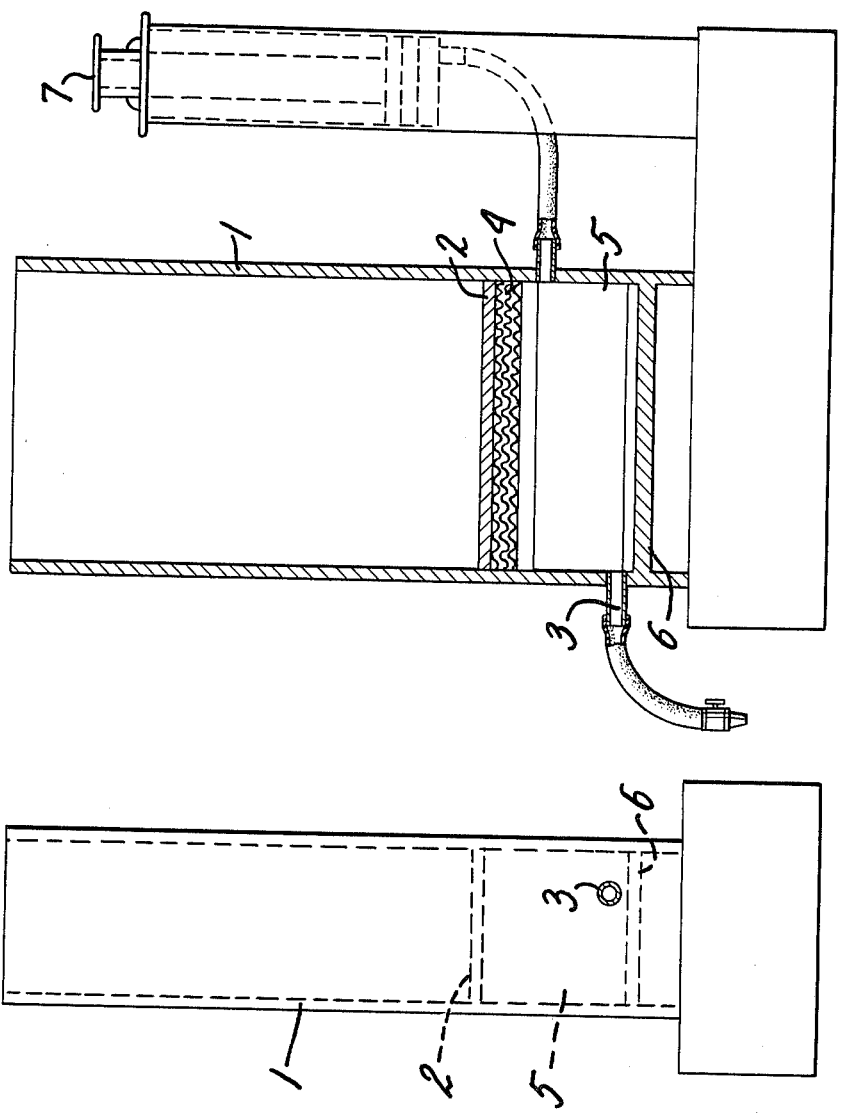

UTILIZATION OF NON-WOVEN FABRICS IN WATER TREATMENT

BACKGROUND OF THE INVENTION

This invention relates to the filtration of water, with or without pretreatment such as flocculation and sedimentation. It relates particularly to large-scale or so-called municipal-type filtration.

SUMMARY OF THE INVENTION

It has been noted that in such filtration an excellent hydraulic conductivity is shown by non-woven and particularly felted fabrics, for example, non-woven fabrics of synthetic fibers or of inorganic fibers such as asbestos and fiberglass. This characteristic of the non-woven fabrics is allied with non-clogging characteristics, low cost, availability and ease of handling. Tests and research have been conducted on the utilization of non-woven fabrics as a substitute for the conventional granular filtering materials (sand, gravel, anthracite, etc.), which are traditionally employed in water treatment. A collateral program researched the utilization of non-woven fabrics in the treatment of sewage effluents, the filtration of oil, the filtration of air and industrial dust, and so on.

The program's principal purpose was to find an efficient substitute for the conventional filtering mass, thereby avoiding its inconvenients, such as the distribution of several superimposed layers of granular matter in critical size gradings, localized head losses, susceptibility to choking or clogging or both, periodic backwashing and cleaning operations, possibility of "sand ball" formation due to layers mixing during backwash, formation and retention of a gelatinous layer ("schmutzdecke"), the filter's height requisites, the necessity for large areas for installation, and so on.

Woven fabrics were also compared with the non-woven and felted ones, in the testing program. They, as well as the conventional sand filter type installations, were found unable to produce results equal to those of the new, used materials, as will be shown herein.

The invention, accordingly, comprises a method, and apparatus for filtering water, or other liquids, through a suitably supported non-woven blanket of felted fibers.

BRIEF DESCRIPTION OF THE DRAWINGS

In the drawings:

FIG. 1 is a front view of a model-sized embodiment of the new filter;

FIG. 2 is a side view thereof;

FIG. 4, the variation of effluent turbidity during the operation;

FIG. 5, the dependence of the effluent turbidity on the raw water turbidity; FIG. 6, the dependence of the filtration rate on the applied hydraulic head; FIG. 7, backwash characteristics;

FIG. 8 the first cost;

FIG. 9 the operating cost;

DESCRIPTION OF THE PREFERRED EMBODIMENTS

Figure 3:
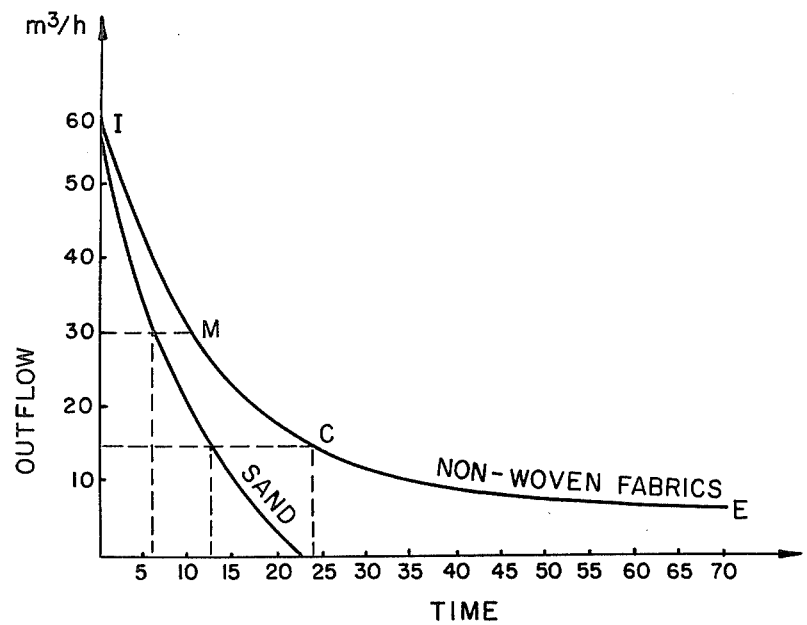
FIGS. 3 to 7 are graphic, comparative charts, showing characteristics of operation of the new filter and of conventional filters, there being shown in FIG. 3, the useful life of the filters.

Referring first to FIGS. 1 and 2, the model filter shown here has been built, having a container 1 of transparent synthetic plastic material; a metallic retention screen 2 horizontally inserted therein between the top inlet and the bottom thereof; and a filtered water outlet 3 below this screen. A sheet or plate 4 of non-woven fabric, as identified above, is horizontally supported on a support 5 comprising small, slotted, ceramic support blocks of a type known as Leopold blocks, which in turn rests on a bottom 6. The unit is provided with a syringe-type backwash device 7.

The fabric 4 has a preferred thickness of about 1.5 to 4.5 mm., particularly when synthetic fibers are used. In some cases, and mainly with fiberglass fibers, a greater thickness of the blanket, up to 30 mm., can be used. The typical and synthetic fiber blankets have a weight of 140 to 600 g./m$^2$;

a porosity of 80 to 96%; and a permeability of 0.02 to 0.6 cm/s. They provided filtration ratios of 140 to 280 gal./min./sqn. ft.

The fibers generally have a density of 1 to 2.3 g./cm.$^3$, or in the case of fiberglass, 0.02 to 0.05 g./cm.$^3$.

Heretofore, non-woven fabrics, particularly to felted fibers, have been used for many purposes, such as clothing and acoustic insulation; and many elements for public works, road-building, soil stabilization, and the like. They have not, thus far, been used as filtering media; particularly not for the filtering processes contemplated herein.

Figure 10:
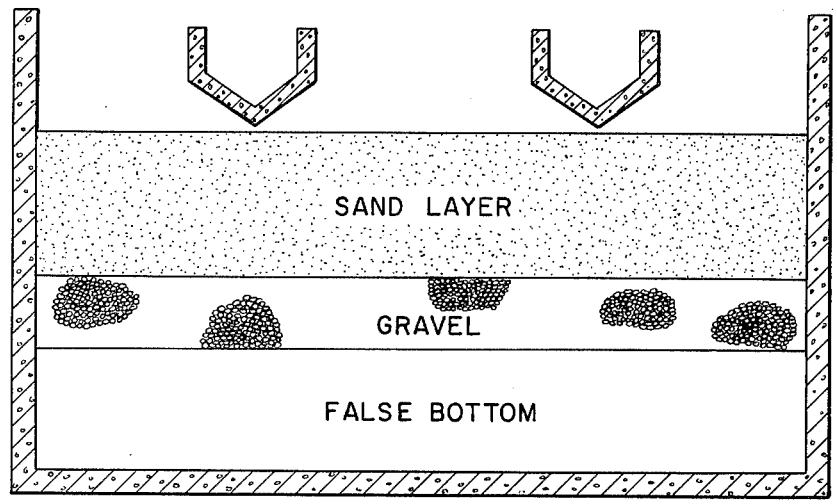
FIGS. 10 and 11 are, respectively, a cross-section and a sectional plan view of a conventional filter.
Figure 11:
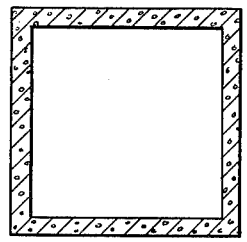
Figure 12:
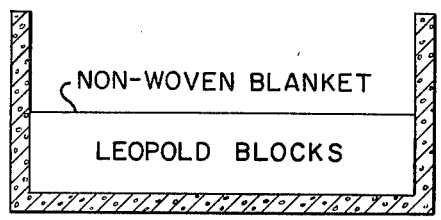
FIG. 12 is a cross-section of a first embodiment of the new filter.
Figure 13:
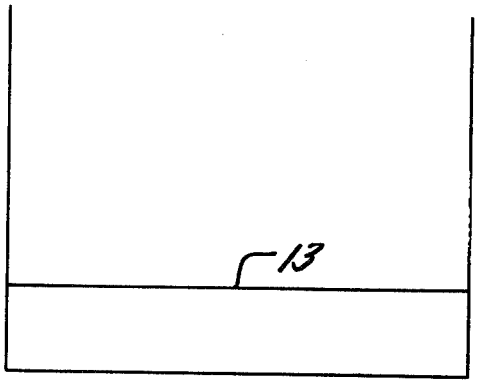
FIGS. 13 to 18 are various transverse cross-sections thereof, taken generally along lines X—X in FIG. 12.
Figure 14:
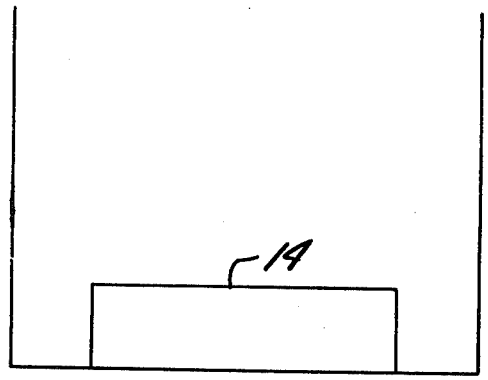
Figure 15:
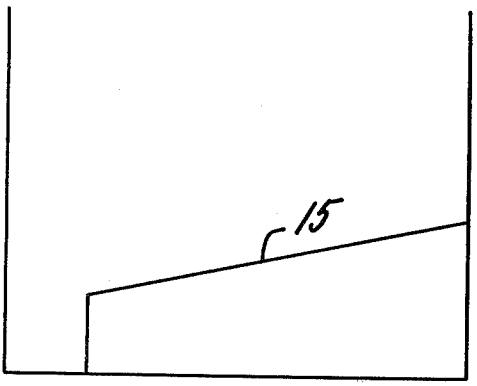
Figure 16:
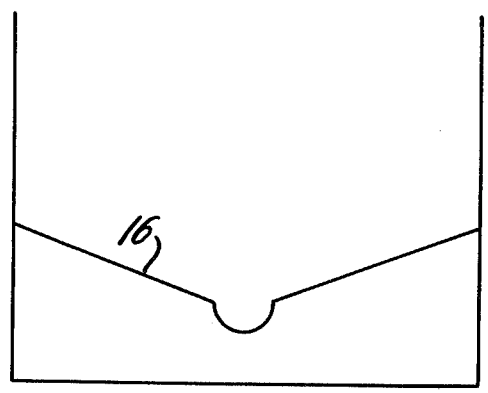
Figure 17:
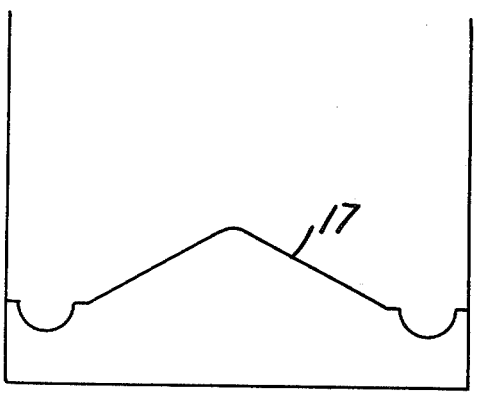
Figure 18:
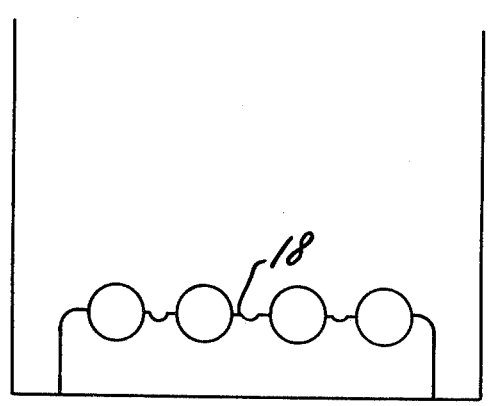

Pilot tests, with new filters of the type shown in FIGS. 12, 13, as well as comparative tests with conventional filters, FIGS. 10, 11, were also conducted. The same type of non-woven filter material as described above was used in the new pilot filters. In these new filters, it was found that there was obtained a rather superior hydraulic discharge, and a most superior and almost incredibly high reduction of turbidity and color.

Figure 21:
FIGS. 21 and 22 are photolithograph copies of microphotographic pictures enlarged 1:100 and showing fragments of non-woven material used in accordance with the invention.
Figure 22:

With respect to FIGS. 21, 22: the original fabric was inspected with a scanning electron microscope, producing enlargements of 30× to 300×; and an enlargement of 100× was used for these figures. As shown in those illustrations, the fibers have a thickness of about 30 microns. The two figures show the appearance pursuant to their filtering use, and prior to back washing. As clearly shown, the felted mass does not retain particular deformations caused by the filter water. On the outlet site, minute particles were noted.

This examination showed that the non-woven fabric has non-clogging qualities as only a superifical deposition could be seen on the surface contacted by the filtered material. The interior of the non-woven blankets retained no particles from the percolating water. On the surface opposite the water outlet, only insignificant quantities of extremely small particles could be detected, most of which had passed through the non-woven blanket's network.

FIG. 3 shows self-explanatory filtration data, including the critical point C of filter clogging, for the new filter and for the usual sand filter. It will be understood that back washing is most usefully applied at C.

Similarly self-explanatory legends will be found in FIGS. 4 to 7. The raw water came from a brook, and had been pretreated by a flocculation and settling process. It arrived at the filter with a color of 130.00 mgPt/l and a turbidity of 100 Jackson units of turbidity (jut). The water pre-filtration test series was effected with non-woven fabric blankets having thicknesses from 1.20 to 5.00 mm. There was a considerable color and turbidity reduction, to 80.00 mgPt/l (color) and 6.00 JUT (turbidity).

After the pre-filtration tests were completed, a series of specific filtration tests with non-woven fabrics were conducted, substituting the conventional granular filtering mass, in one of the filters. In this instance, the blankets' hydraulic performance was considerably superior to the one obtained in the pre-filtration tests, due to the horizontal position of the blanket. There was no perceptible increase of the water level. The filtration rate was kept within constant limits. Water coloring was reduced to approximately 3.00 mgPt/l and the turbidity was practically reduced to zero.

Later, an assessment of the non-woven fabrics' performance in direct filtration of raw water was tried, through a deactivation of the chemical pre-treatment. There was a considerable reduction in color and turbidity, which is a highly significant result with economically favorable implications.

Studies on the life of the filtering layer were also carried out with reference to both filters. (FIG. 3) This involved continuous filtration until the occurrence of complete blocking through clogging. After 23.00 . . . hours of continuous filtration ("filtration run"), the conventional granular filtering mass was totally clogged and the initial flow rate of 60.00 m$^3$/h . . . (0.02 m$^3$/s) was reduced to 0 (zero), whereas after 63.00 hours, in the case of non-woven fabrics, the flow rate was reduced to 8.00 m$^3$/h (0.002 m$^3$/s), and remained constant until the end of the test period (72 hours).

Referring to "half-life" as the time in which the filtering flow rate is reduced to half of the initial flow rate (point "M" in the graph), it can then be seen that sand & gravel filters need 6 hours to reach this rate, whereas 11 . . . hours are needed in the case of the non-woven fabrics filters. The so-called "critical point" (point "C" in the graph), when the flow rate is reduced to the minimum required by typical water systems, is reached after 13 hours of continuous filtration with sand and gravel filters, and after 24 hours in the case of non-woven fabrics filters. Point "M" represents the ideal time for a short and easy backwash, whereas the backwashing at point "C" needs to be longer and more violent.

Figure 4:
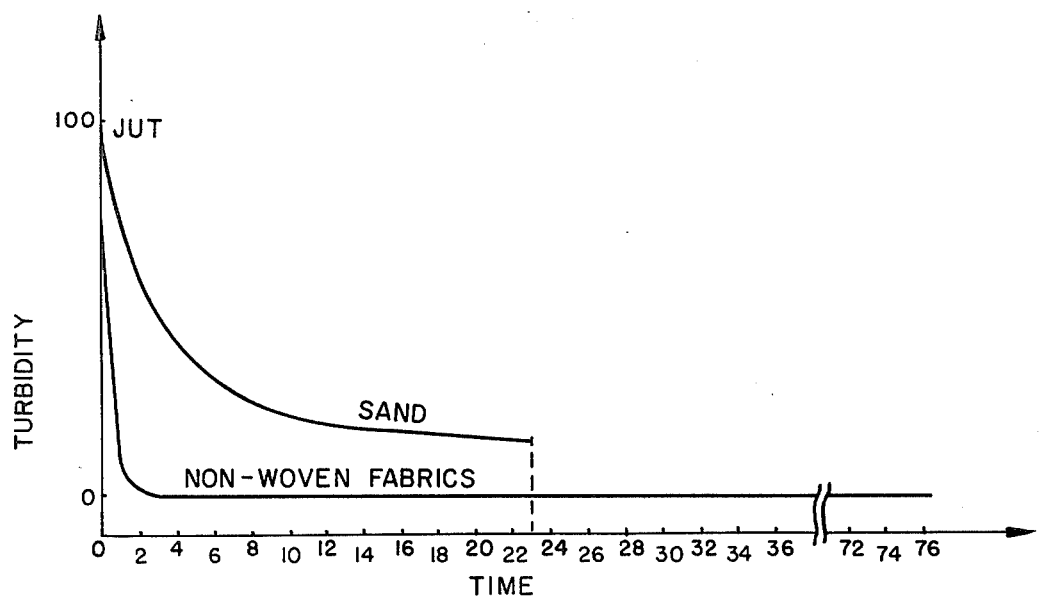
Figure 5:
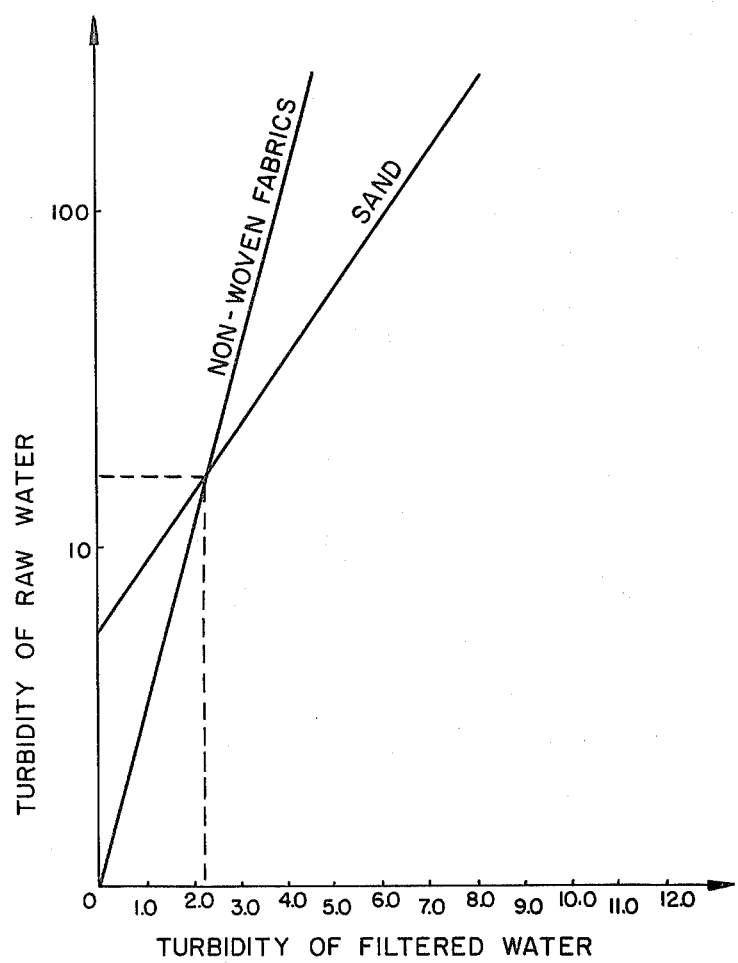

FIGS. 4 and 5 represent the variation of the initial turbidity of filtered water, applying a time factor. This graph shows that an initial value of 100.0 JUT, the turbidity was reduced to 15.00 JUT after 23 hours of filtering in the sand filter, after which the flow rate decreased to 0 due to total clogging, whereas in the case of the non-woven fabrics, the turbidity after 3 hours of filtration, was reduced to 0 and remained as such until the end of the tests (76.00 hours).

Studies on raw water turbidity as related to that of filtered water showed remarkable results. The following will be understood from FIG. 5.

With the sand and gravel filter, a 200.00 JUT maximum raw water turbidity has a corresponding filtered water turbidity of 8.00 JUT and, for the minimum 5.6 JUT raw water turbidity, the corresponding filtered water turbidity equals 0; this ratio defines a straight line which can be mathematically expressed by the following equation:

$$T = 5.6 + 1.48 \log T_o$$

where: $T$ = filtered water turbidity and $T_o$ = raw water turbidity.

With the non-woven fabrics filter, a maximum 260.00 JUT "T" corresponds to a 4.50 JUT "$T_o$". The corresponding straight line can be thus equated:

$$T = 3.86 \log T_o$$

Figure 6:
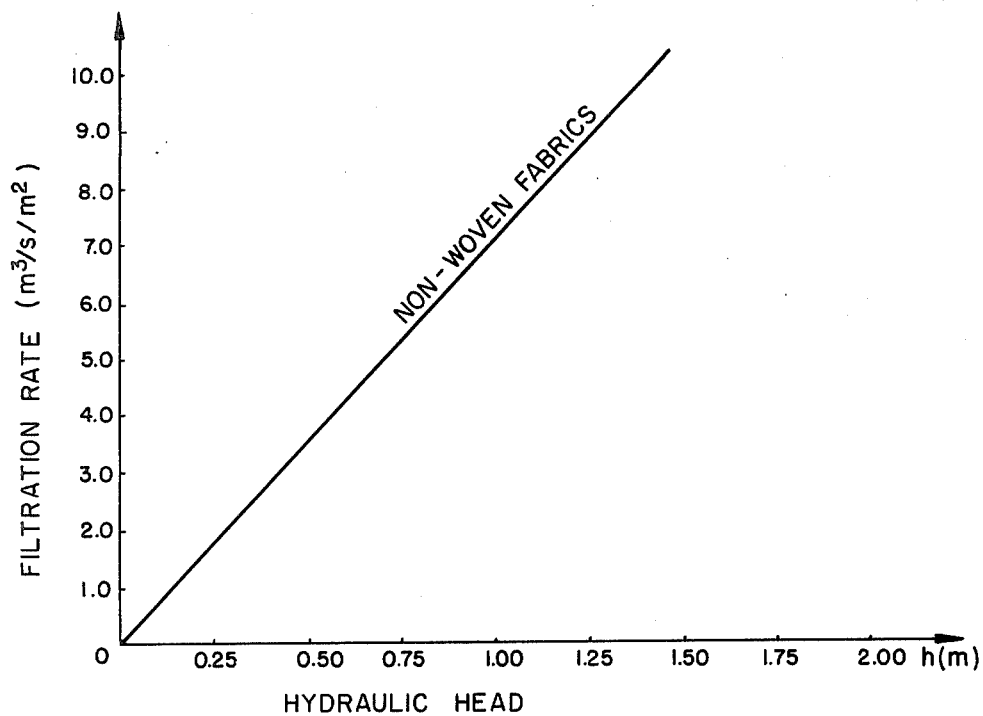
Figure 7:
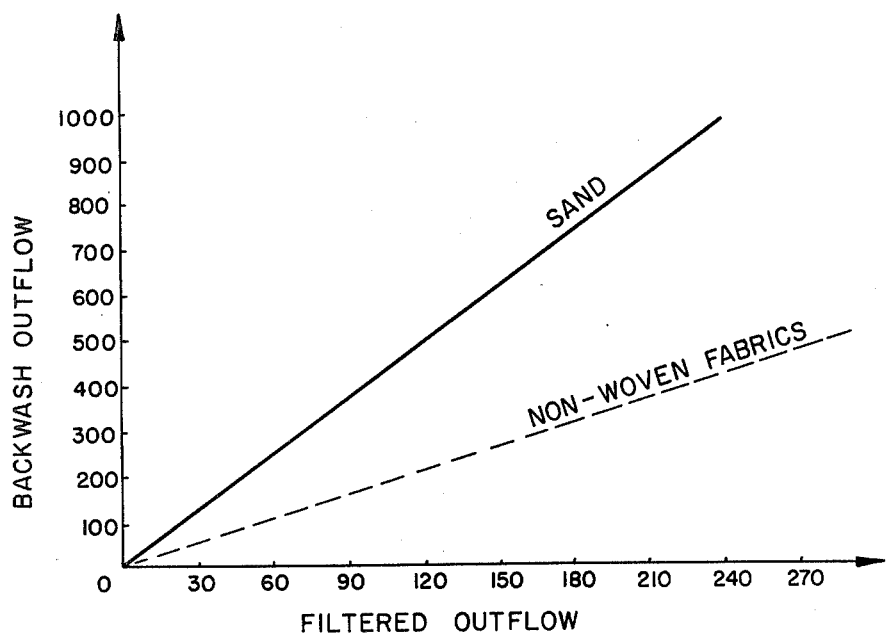

Experimental studies regarding the non-woven fabric's filtration rates as a function of applied hydraulic heads showed a linear behavior which can be translated into the following equation, according to FIG. 6:

$$Q = 7.19 \, h$$

where "Q" = filtration rate (m$^3$/s/m$^2$) and "h" = hydraulic head (m). Thus, if "h" is equal to 0.50 m, we have "Q" equal to 3.60 m$^3$/s/m$^2$.

Regarding backwash (FIG. 7) the frequency was reduced to 50% in the pre-filtration test series. In the comparative filtration tests, considering a 120.00 m$^3$/d/m$^2$ (0.0014 m$^3$/s/m$^2$) filtration rate, and a 10 l/s/m$^2$ backwash flow rate during 10 minutes, the resulting linear behavior straight lines can be represented by the following equations:

| Sand and Gravel | $Q_t = 4.17 \, Q$ |
| --- | --- |
| Non-Woven Fabrics | $Q_t = 1.76 \, Q$ | where: "Q" = flow rate (liters/second) and "Qt" = total flow rate (cubic meters/day). This is demonstrated in the enclosed graph.

Figure 8:
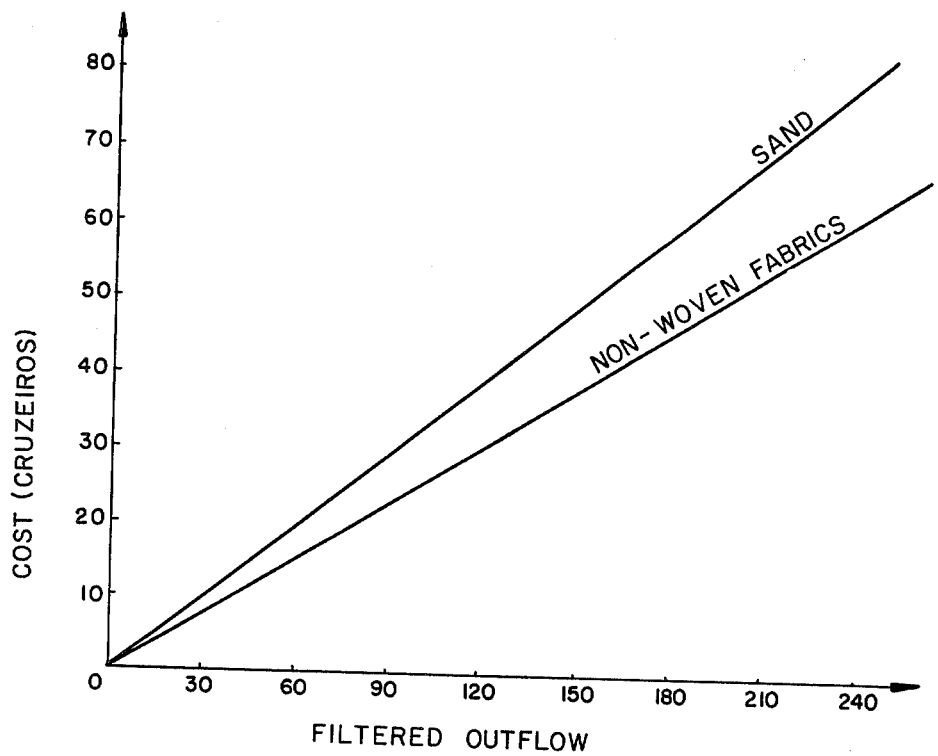
FIGS. 8 and 9 are graphic, comparative charts, showing costs of the new and conventional filters, there being shown.
Figure 9:
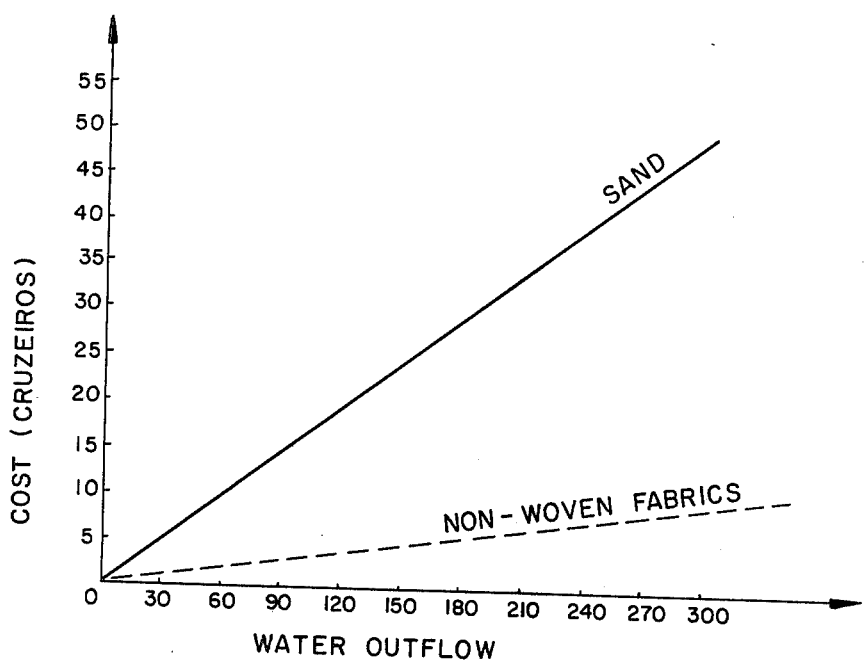

FIGS. 8 and 9 show the comparative costs of the basic units and performances, described above, for the conventional filters and the new, non-woven fabric filter, in Brazilian currency (1 Cr $ or Cruzerio equals about $0.16 U.S. currency).

In the new filter (FIG. 12), the non-woven blanket can be supported on Leopold blocks or the like, shown at 13, 14, 15, 16, 17 and 18 in the correspondingly numbered figures.

Figure 19:
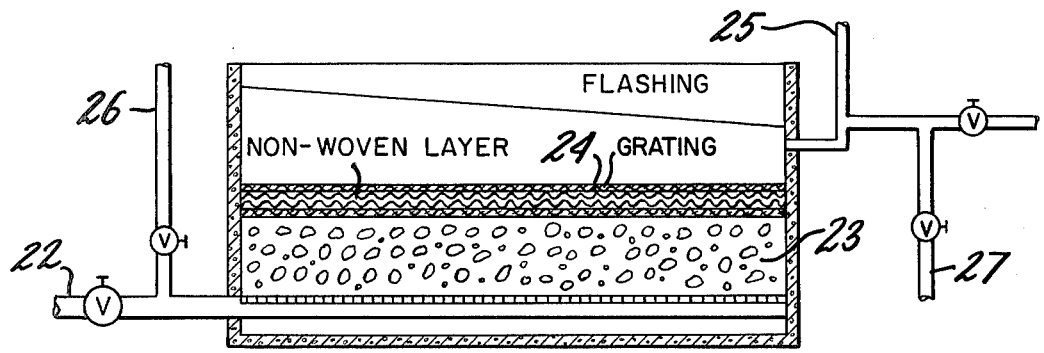
FIGS. 19 and 20 are cross-sections, showing respectively, a modified, second and third embodiment of the new filter.
Figure 20:
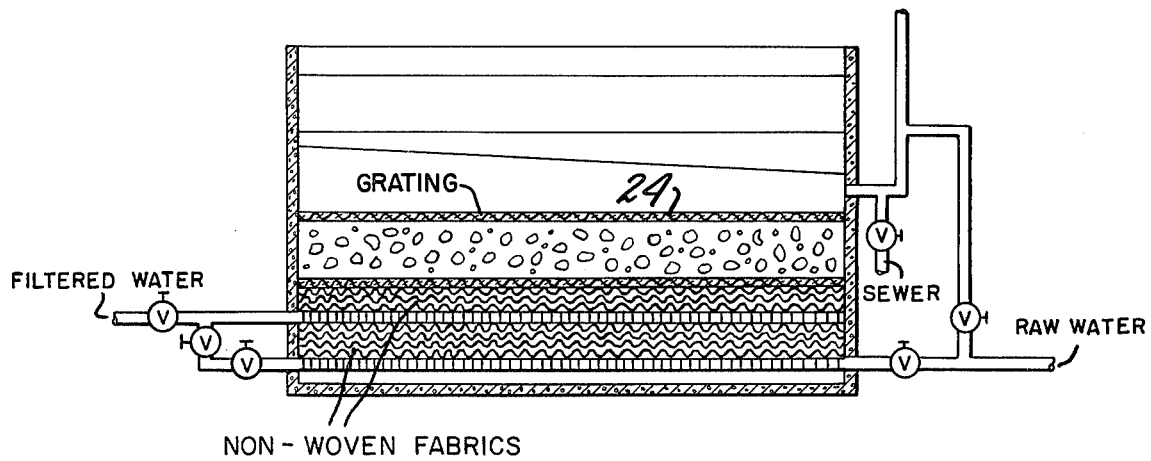

In FIG. 19 the filter is of municipal type, and has a raw water inlet 25 in its top. The water passes through the non-woven layer and through gravel 23, which supports the non-woven blanket, or layer, as shown. A grating 24 holds and protects this layer. The usual connections for filtered water are shown at 22, wash water (in) at 26 and (out) at 27. FIG. 20 will be found self-explanatory.

The advantages of the new filter material include:
Higher filtration rates.
Improved efficiency of color and turbidity reduction.
Reduced loss of head across the filter bed.

Lower building costs due to the possibility of reducing the installation area and the height of the units.

The non-woven fabrics' perfect adaptation to modern filter bottoms (e.g. Leopold blocks).

Easier cleaning and washing due to the non-clogging interior of the filtering mass.

Lower wash water consumption rates.

Lower maintenance needs resulting from the absence of problems originated by the stirring of the granular layer (sludge balls), and the attachment of a gelatinuous layer (schmutzdecke).

Less interference of the human element (operators) due to the non-critical water flow rates and shorter cleaning periods. (Possibilities of Automation).

Simplification of operational and functional system.

Easier and cheaper periodic replacement of the filtering element.

Lower consumption of chemicals due to the improved color and turbidity reduction, characteristic of non-woven fabrics filters.

Lower installation and operational costs than required by conventional filters.

Longer component life (a non-woven fabrics filter operated continuously, without replacements, throughout a two-year period).

More economical pumping of the treated water, resulting from higher filtration rates.

What is claimed is:

1. A filter for filtering water, comprising a lower horizontal water-pervious supporting means, filtering blanket of uniform thickness lying on and supported by said lower supporting means, said blanket comprising superposed layers of non-woven fabric comprising felted fibers selected from the group consisting of synthetic fibers and inorganic fibers, an upper water-pervious supporting means of overlying said blanket to confine said blanket between said lower supplying means and said upper supporting means, means for supporting raw water under pressure to pass through said blanket in one direction to filter said water and means for passing washwater through said blanket in the opposite direction to back-wash said filter.

2. A filter according to claim 1, in which said fibers are synthetic fibers having a thickness of about 30 microns.

3. A filter according to claim 1, in which said fibers are synthetic fibers and have a density of 1 to 2.3 g/cm$^3$.

4. A filter according to claim 1, in which said fibers are fiberglass and have a density of 0.02 to 0.05 g/cm$^3$.

5. A filter according to claim 1, in which said blanket has a porosity of 80 to 96% and a permeability of 0.02 to 0.6 cm/s.

6. A filter according to claim 1, in which said lower supporting means comprising small, slotted ceramic blocks.

7. A filter according to claim 1, in which said lower supporting means comprises a layer of gravel below said blanket and said inner supporting means comprises a grating above said blanket, the direction of flow for filtering being down through said grating, blanket and gravel layer.

8. A filter according to claim 7, in which a grating is interposed between said blanket and said gravel layer.

9. A filter according to claim 1, in which said upper supporting means comprises a layer of gravel superposed on said blanket with a grating above said gravel layer.

10. A filter according to claim 9, in which a grating is interposed between said blanket and said gravel layer.

* * * * *